No. 788,023. PATENTED APR. 25, 1905.
B. COUCH & J. D. KNEEDLER.
BILL OR INVOICE FILE.
APPLICATION FILED MAR. 31, 1904.
2 SHEETS—SHEET 1.
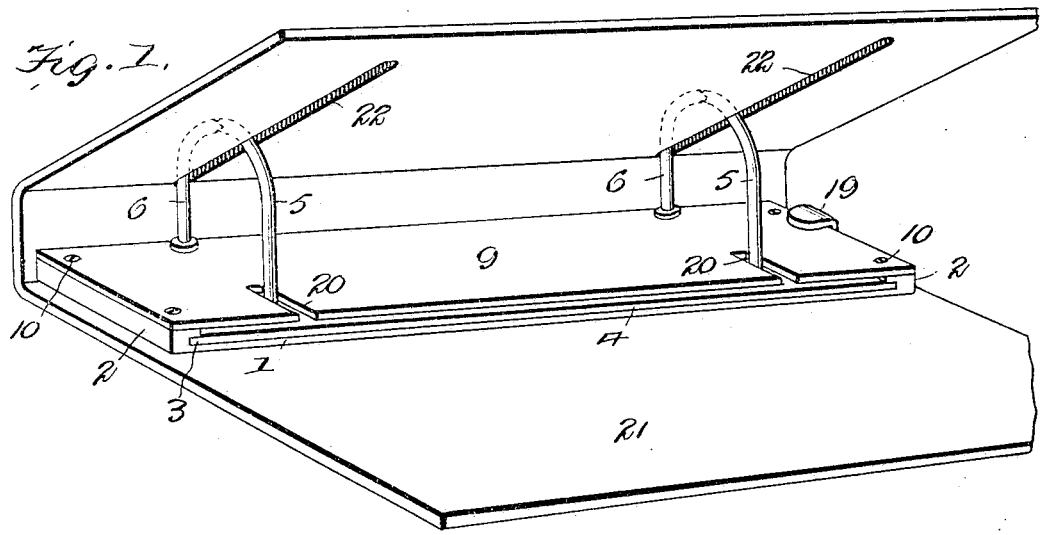
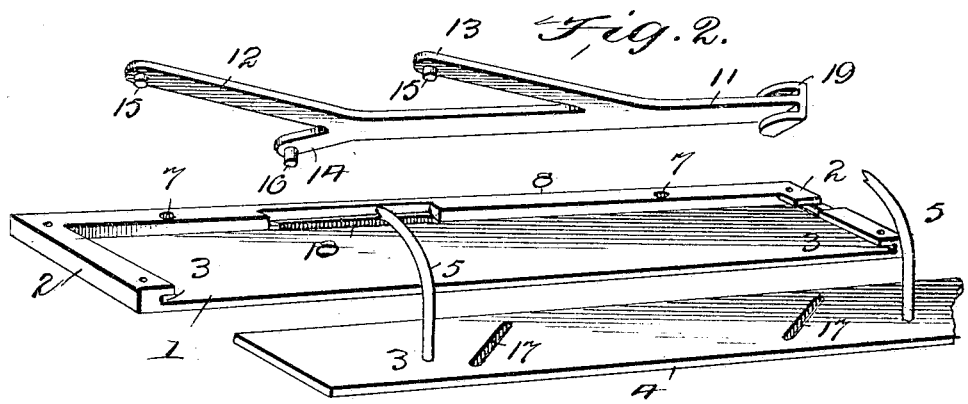
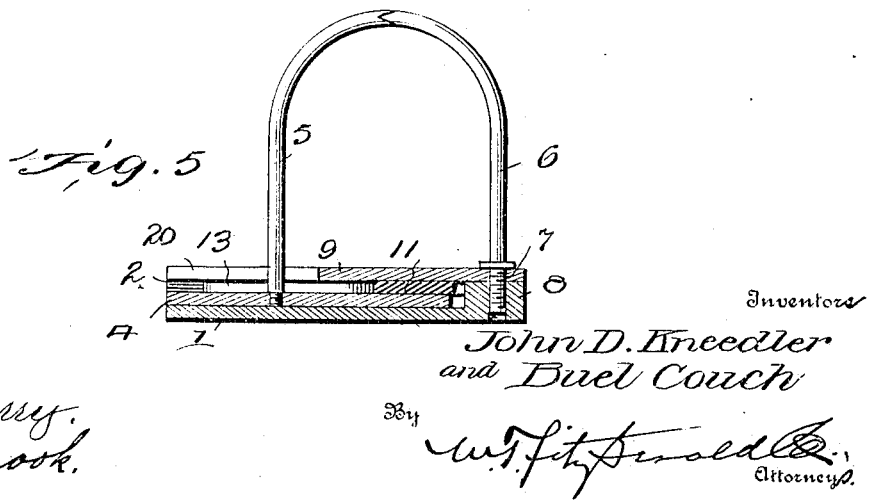
Witnesses
Inventors
John D. Kneedler
and Buel Couch
By
Attorneys No. 788,023. PATENTED APR. 25, 1905.
B. COUCH & J. D. KNEEDLER.
BILL OR INVOICE FILE.
APPLICATION FILED MAR. 31, 1904.
2 SHEETS—SHEET 2.
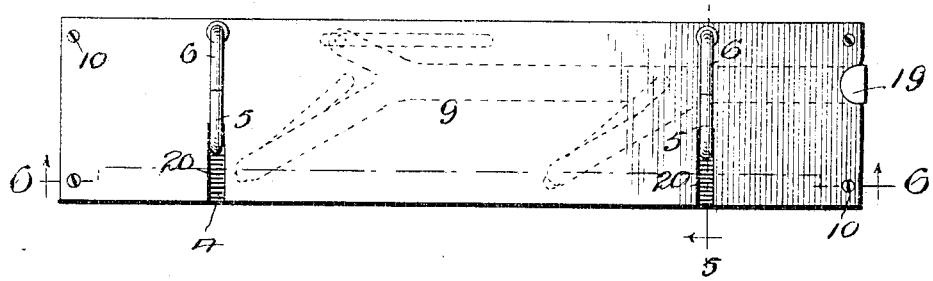
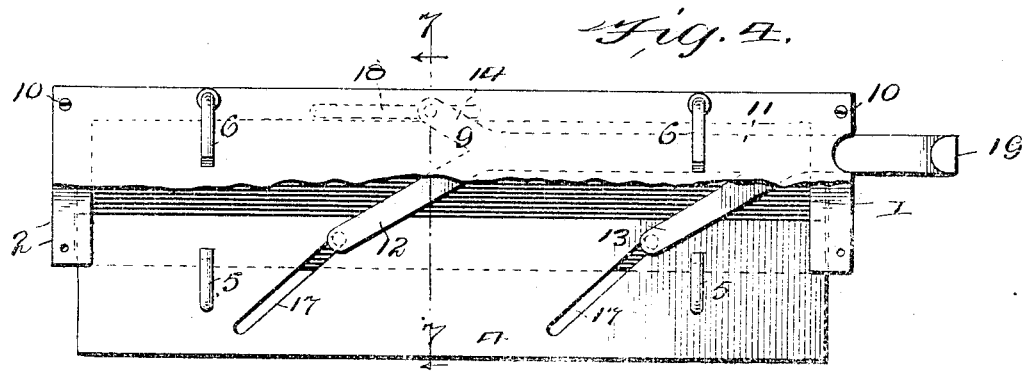
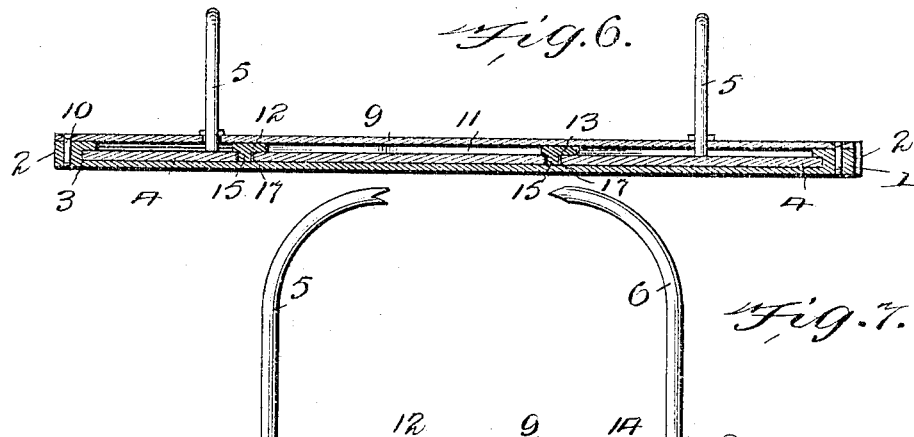
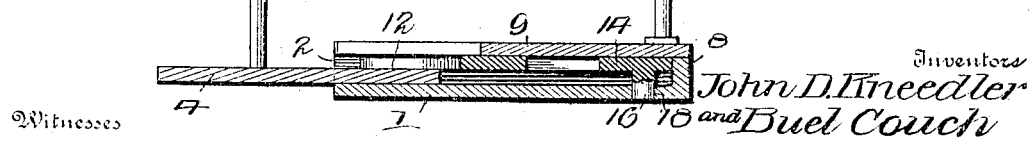

No. 788,023. Patented April 25, 1905.

UNITED STATES PATENT OFFICE.

BUEL COUCH AND JOHN D. KNEEDLER, OF SIOUX CITY, IOWA.

BILL OR INVOICE FILE.

SPECIFICATION forming part of Letters Patent No. 788,023, dated April 25, 1905.

Application filed March 31, 1904. Serial No. 200,979.

*To all whom it may concern:*

Be it known that we, BUEL COUCH and JOHN D. KNEEDLER, citizens of the United States, residing at Sioux City, in the county of Woodbury and State of Iowa, have invented certain new and useful Improvements in Bill or Invoice Files; and we do hereby declare the following to be a full, clear, and exact description of the invention, such as will enable others skilled in the art to which it appertains to make and use the same.

Our invention relates to what may be termed an "invoice and bill file," which will be found very desirable and valuable for temporarily holding and filing away valuable papers, as letters, invoices, bill-heads, and the like; and our invention consists of certain novel features of combination and construction of parts, as will be hereinafter fully set forth, and pointed out in the claims hereunto appended.

The main object of our invention is to provide a file or holding device of the character specified which will be found to be thoroughly reliable and efficient in the performance of its office and which may be very conveniently operated to introduce one or a number of letters, invoices, or the like and permit the same to be quickly withdrawn therefrom as desired.

A further object of our invention is to provide an appliance of the character set forth by means of which bills, invoices, and other papers may be readily filed away in book form, and thus rendered easily accessible and capable of being easily carried or moved from one place to another without liability of separating the assembled invoices, bills, or other papers.

Other objects and advantages will be fully set forth in the following specification considered in connection with the accompanying drawings, which are made a part thereof, and in which—

Figure 1 shows a perspective view of our bill-file complete ready for use. Fig. 2 is a perspective view showing the upper portion of the casing removed and also showing the interior working parts of our appliance separated from the casing. Fig. 3 is a top plan view of our bill-file proper separated from its housing or book-like cover. Fig. 4 is a similar view to that presented in Fig. 3, showing the upper part of the casing cut away and the outer posts separated from engagement with the inner posts. Fig. 5 is a sectional view of Fig. 3 on line 5 5. Fig. 6 is a longitudinal section taken on line 6 6 of Fig. 3. Fig. 7 is a sectional view taken on line 7 7 of Fig. 4.

The various parts of our invention and also the coöperating elements will for convenience be referred to by designating-numerals, it being understood that each numeral refers to a corresponding part throughout the drawings.

Referring to the numerals on the drawings, 1 indicates the bottom portion of the casing, said bottom portion having at its ends cleats or flanges 2, so formed upon their inner edges that the recesses 3 will be provided. Designed to fit in the recesses 3 is the movable plate 4, which has erected thereon the rigidly-mounted standards or bill-hooks 5, said standards being either pointed or provided with a socket to coöperate with or properly engage the ends of the complementary standards or brackets 6, which are permanently secured in place by being entered in suitable apertures 7, provided in the flange or rib section 8, as clearly shown in Fig. 2 and other views. We also provide for the casing thus or otherwise formed the lid-section 9, held in place as by the screws or rivets 10, it being understood that said lid-section shall be provided with suitable apertures adapted to register with the apertures 7, whereby the lower ends of the hook members 6 may be reliably anchored in place in any preferred way.

In order that the plate 4 may be reliably placed under the control of the operator, we provide the controlling-bar 11, having upon one side the extensions or fingers 12 and 13 and also having upon the opposite edge the extension 14. The extensions 12 and 13 are each provided with a downwardly-directed lug 15, while the extension 14 is provided with a similarly-directed lug 16, the lugs 15 being designed to take into the obliquely-disposed slots 17, formed in the movable plate 4, while the lug 16 is disposed in the longitudinal slot 18, formed in a contiguous part of the bottom section 1, the rib or flange 8 being cut away to provide a place therefor, as will be readily understood by reference to Fig. 2.

It will be understood that the controlling-bar 11 is of sufficient length to extend outward through a suitable slot formed in a proper part of the flange 2, the extreme end of said arm being provided with a suitable handle, which in this instance comprises the inwardly-directed parallel lips 19, adapted to rest upon either side of the casing, whereby it may be conveniently grasped by the thumb and finger of the operator.

By the construction hereinbefore presented and illustrated in the drawings it will be obvious that we have provided simple though reliably efficient controlling means for the outer hook members 5, inasmuch as an outward pull upon the handle 19 will withdraw the bar 11 and cause the lugs 14 and 15 to travel in their respective slots, thereby forcing the plate 4 to move outward, suitable slots 20 being provided in the outer edge of the lid-section 9, whereby the posts may be moved inwardly or outwardly, as required.

We also provide a book-like cover 21, having suitable slots 22, whereby the upper free ends of the hook members 5 and 6 may be compensated for and permitted to protrude therethrough, the said cover resting directly upon and protecting the bills, invoices, and other papers interposed between the covers.

It will be understood that the ends of the hook members 5 may be pointed to take into conical seats provided in the members 6, or vice versa, as may be deemed productive of the best results.

It will thus be observed that we have provided a very compact and reliable form of invoice and bill holder, the parts of which may be very cheaply and expeditiously manufactured and each assembled in its respective operative position, and while we have described the preferred combination and construction of each part presented we wish to reserve the right to make such reasonable modifications and changes as may be regarded as falling fairly within the scope and purview of our invention.

Obviously our invention may be easily controlled or operated, as all that is required when it is desired to introduce or remove a bill or invoice or other paper engaged by the hooks 5 and 6 is to withdraw the bar 11 sufficiently to force the plate 4 outward and incidentally separate said hook members 5 and 6 a proper distance to admit the reception of any papers or the removal thereof, as may be desired. After the papers have been removed or disposed in place over the hooks 5 the bar 11 is forced inward through the mediation of the controlling-handle 19, when the said bill-hooks 5 and 6 will be brought into engagement with each other, when it will be impossible for the papers to become casually disengaged.

It is obvious that the cover-section 21 may be made of proper size to accommodate the size of the papers to be inclosed therein. It is, furthermore, apparent that our improved bill and invoice file may also be made of any desired size and of any preferred material deemed most suitable for the purpose, and believing that the advantages and manner of using our invention have thus been made clearly apparent further description is deemed unnecessary.

Having thus fully described our invention, what we claim as new, and desire to secure by Letters Patent, is—

1. The herein-described bill and invoice file comprising a casing having a pair of hook members 6 rigidly mounted thereon, a plate laterally movable and mounted in said casing and having the bill-hooks 5 complementary to the hook members 6, means to move said plate and the bill-hooks carried thereby inward or outward comprising a bar having fingers upon one side thereof, downwardly-directed lugs secured to the outer ends of said fingers and adapted to engage obliquely-disposed slots in said plate, and an extension 14 upon the opposite side of said bar having a lug adapted to engage a longitudinal slot in the casing, substantially as and for the purpose set forth.

2. The herein-described bill and invoice file for papers of any character, comprising a suitable casing, a movable plate 4 mounted in said casing, hook members 6 rigidly secured to said casing and additional hooks 5 carried by said movable plate, a controlling-bar having obliquely-disposed extensions, lugs secured to the outer ends of said extensions adapted to engage obliquely-disposed slots in said plate and a member 14 having a depending lug adapted to engage a longitudinal slot in the casing whereby, when said bar is moved longitudinally outward, said bar will be held against lateral movement and the plate moved from the casing and the paper-engaging devices separated, all combined substantially as set forth.

3. A bill and invoice file comprising a suitable casing having recesses 3 in the end sections thereof, hook members 6 rigidly secured to said casing, a plate mounted in said casing the ends thereof taking into said recesses and slidable transversely therein, bill-hooks 5 carried by said plate and protruding through the casing, a bar longitudinally, movably secured in said casing, said bar having a pair of obliquely-disposed arms protruding from one side thereof, said arms having depending lugs adapted to engage obliquely-disposed slots in said plate, and an extension 14 protruding from the opposite side of said bar, also having a depending lug to engage a longitudinal slot in the casing, substantially as and for the purpose set forth.

In testimony whereof we have signed our names to this specification in the presence of two subscribing witnesses.

BUEL COUCH.
JOHN D. KNEEDLER.

Witnesses:
    JOHN A. BERRY,
    HUGO ASNUS.